United States Patent [19]

Miyake

[11] Patent Number: 4,568,311

[45] Date of Patent: Feb. 4, 1986

[54] FLEXIBLE WRIST MECHANISM

[75] Inventor: Norihisa Miyake, Ibaraki, Japan

[73] Assignee: Hitachi, Ltd., Tokyo, Japan

[21] Appl. No.: 457,442

[22] Filed: Jan. 11, 1983

[30] Foreign Application Priority Data

Jan. 29, 1982 [JP] Japan ................................. 57-11622

[51] Int. Cl.$^4$ ......................... B25J 17/02; F16D 3/30
[52] U.S. Cl. ..................................... 464/109; 414/378
[58] Field of Search ................ 464/109, 49, 112, 125, 464/106, 114, 113; 414/375, 378, 4, 1, 7

[56] References Cited

U.S. PATENT DOCUMENTS

| | | | |
|---|---|---|---|
| 1,389,971 | 9/1921 | Noel | 464/109 |
| 3,456,458 | 7/1969 | Dixon | 464/109 |
| 3,497,083 | 2/1970 | Anderson et al. | 414/1 |
| 3,631,737 | 1/1972 | Wells | 414/738 X |
| 4,006,607 | 2/1977 | Kane | 464/109 |
| 4,236,420 | 12/1980 | Geisthoff | 464/109 X |
| 4,353,677 | 10/1982 | Susnjara et al. | 414/735 |

FOREIGN PATENT DOCUMENTS

| | | | |
|---|---|---|---|
| 2339470 | 8/1977 | France . | |
| 111158 | 9/1977 | Japan . | |
| 46471 | 10/1980 | Japan . | |
| 2041879 | 9/1980 | United Kingdom . | |
| 872821 | 10/1981 | U.S.S.R. | 464/109 |

Primary Examiner—Stuart S. Levy
Assistant Examiner—Thomas R. Hannon
Attorney, Agent, or Firm—Antonelli, Terry & Wands

[57] ABSTRACT

A wrist mechanism includes a plurality of rigid links connected together by a plurality of joints, wherein each of the joints includes a joint member interconnecting the adjacent links in a manner to enable an angular displacement to be transmitted between the adjacent links, and an angular displacement transmitting section for transmitting the angular displacement between the links in the form of at least two rotational angle components.

9 Claims, 16 Drawing Figures

FLEXIBLE WRIST MECHANISM

BACKGROUND OF THE INVENTION

This invention relates to a wrist mechanism capable of transmitting an angle to any direction as desired, and, more particularly, to a wrist mechanism suitable for use with an industrial robot.

A principal object of a wrist mechanism of an industrial robot lies, for example, in a realization of controlling the posture of a tool secured to or gripped by the wrist. When operations are performed by inserting a wrist in a narrow space, the wrist mechanism is required to have flexibility.

In providing a flexible wrist mechanism, resilient members may be used however a flexible wrist mechanism of this construction suffers the disadvantages that limitations are placed on the weight of an article to be carried by the wrist and positioning of the wrist itself cannot be effected with accuracy.

Thus, a flexible wrist mechanism of practical use would be composed of a plurality of rigid members connected together in a manner so as to be able to vary their angular relation whereby the mechanism as a whole could be deformed into a curved shape.

Certain terminology will be used in the following description for convenience in reference only and will not be limiting. The word a "finger bone" or "link" will refer to each of the members of the mechanism connected together for relative angular displacement, and the word a "joint" or "junction" will refer to each of the connections between the finger bones.

Needless to say, a flexible wrist mechanism of the aforesaid construction could be realized by providing means separately for driving each of the finger bones. More specifically, a mechanism has been proposed which has a swing motor mounted in each joint, or has finger bones connected together by wires which, in turn, are connected to drive means, such as cylinders, for driving the respective finger bones.

In this type of flexible wrist mechanism, it is not essential that relative angular displacements of the finger bones be independently controlled. In many applications, the flexible wrist mechanism can function satisfactorily by causing all the finger bones to undergo relative angular displacements in an equal amount or in a certain ratio so that the mechanism as a whole can be displaced to form a substantially arcuate shape. In this case, it would not be advantageous to provide drive means for the finger bones independently of one another to obtain angular displacement of each finger bone. It would rather be preferable to minimize the number of the drive means or to use, if possible, the same number of drive means as the degrees of freedom possessed by one junction of the wrist mechanism so that angular displacement can be transmitted to the fingers purely by the action of the mechanism.

In, for example Japanese Patent Application Laid-Open No. 111158/77 and Japanese Utility Model Publication No. 46471/80 it has been proposed to provide mechanisms for enabling a realization of a flexible wrist mechanism. The former application has links connected together as by universal joints into a chain shape, with every other link being pivotally connected to transmit an angular displacement. In the latter, application links are connected together by spherical joints and the link which is located at the end or top of the wrist is connected to wires so that an angular displacement can be successively transmitted to the links by driving the wires.

Some disadvantages are associated with these mechanisms of the prior art. Difficulties are faced with in accurately transmitting an angular displacement between the adjacent links, and the mechanism has to be of complex construction or special construction.

SUMMARY OF THE INVENTION

An object of this invention is to provide a wrist mechanism capable of transmitting an angle three-dimensionally.

Another object is to provide a wrist mechanism of high reliability capable of transmitting an angle accurately.

Still another object is to provide a wrist mechanism low in cost, compact in size and easy to fabricate.

To accomplish the aforesaid objects, the invention provides a wrist mechanism comprising a plurality of rigid links, and a plurality of joints each for connecting the adjacent rigid links together, characterized in that each of the joints comprises a joint member interconnecting the adjacent links in a manner to enable an angular displacement to be transmitted between the adjacent links, and an angular displacement transmitting section provided to the joint member for transmitting the angular displacement between the links in the form of decomposing at least two rotation angle components.

Additional and other objects, features and advantages of the invention will become apparent from the following description when considered in conjunction with the accompanying drawings.

DETAILED DESCRIPTION

A preferred embodiment of the invention will now be described by referring to the accompanying drawings.

Figure 1:
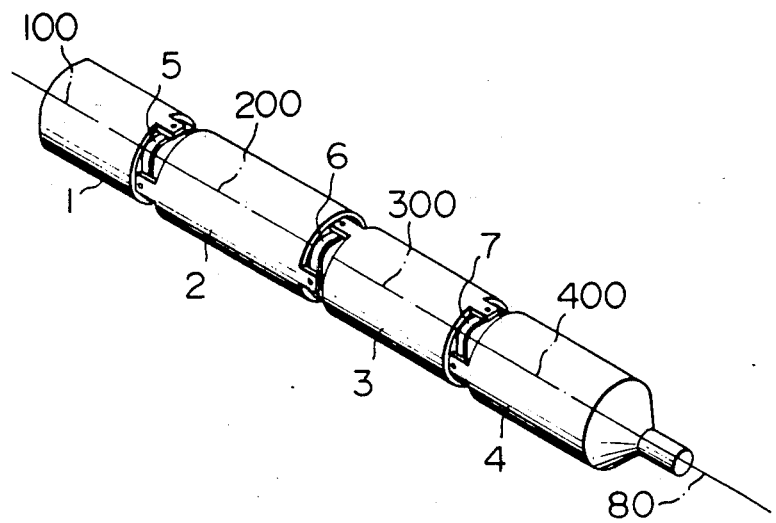
FIG. 1 is a perspective view of the wrist mechanism as a whole comprising one embodiment of the invention.

Referring now to the drawings wherein like reference numerals are used throughout the various views to designate like parts and, more particularly, to FIG. 1 according to this figure, a wrist mechanism in accordance with the invention includes finger bones 1, 2, 3, 4, joints 5, 6 and 7, with the joint 5 interconnecting the two finger bones 1, 2; the joint 6 interconnects the finger bones 2 and 3; and the joint 7 interconnects the finger bones 3 and 4.

In the wrist mechanism according to the invention, for example, the finger bone 1 can be affixed to the forward end of an arm of an industrial robot, and the finger bones 2, 3 and 4 can be used as a wrist of the robot, with the finger bone 4 having a tool affixed thereto or gripping same to enable the wrist mechanism to function as an arm of the robot which can perform operations even in a narrow space.

In FIG. 1, the posture of the mechanism in which axes 100, 200, 300 and 400 of the finger bones 1, 2, 3 and 4, respectively, are in alignment with one another along a straight line 80 defining a standard posture, and the straight line 80 will be referred to as a basic axis.

In the wrist mechanism according to the invention, the joints 5, 6, 7 are substantially of the same construction and may be in the form of a universal joint represented by gimbals or a Hooke's cross joint. As shown most clearly in FIGS. 2 and 3, gimbals 10 of the joint 5 are connected to the finger bones 1, 2 through shafts 11, 12, 13, 14, with the shafts 11, 13 and the shafts 12, 14 being arranged in the gimbals 10 in such a manner that the main axes 110, 130 and the main axes 120, 140 are respectively in alignment with each other. The main axes 120, 140 and the main axes 110, 130 cross each other at a right angle at a point 50, with the point 50 defining a center point of the joint 5.

The shafts 11, 13 and the shafts 12, 14 are respectively connected to the finger bones 2, 1, with the shafts 11, 12 being respectively affixed to the finger bones 2, 1. The shafts 13, 14 are respectively connected through bearings 13a, 14a to the finger bones 2, 1 for rotation. The shafts 11, 12, 13 and 14 are respectively connected through bearings 11a, 12a, 13b and 14b to the gimbals 10 for rotation.

In the wrist mechanism of the aforesaid construction, the finger bones 1, 2 have degrees of freedom for producing rotational angular displacements about the main axes 110, 130.

The gimbals 10 have located at the outer periphery a spur gear 111 using the main axis 110 of the shaft 11 as the center axis and a spur gear 121 using the main axis 120 of the shaft 12 as the center axis which are rotatably connected to the gimbals 10 for rotation with respect to the shafts 11, 12 through bearings 11a and 12a, respectively. The shafts 13, 14 have affixed thereto spur gears 131, 141 using the main axes 130, 140 as their center axes respectively. The shafts 11, 12, 13 and 14 have affixed at their ends within the gimbals 10 to bevel gears 112, 122, 132 and 142 using the main axes 110, 120, 130 and 140 as their center axes, respectively. The bevel gears 112, 142, 122, 132 are in meshing engagement with each other, with the spur gear 121 having transmitted thereto a motive force for moving the wrist mechanism in a horizontal plane, and the spur gear 141 having transmitted thereto a motive force for moving the wrist mechanism in a vertical plane.

Figure 3:
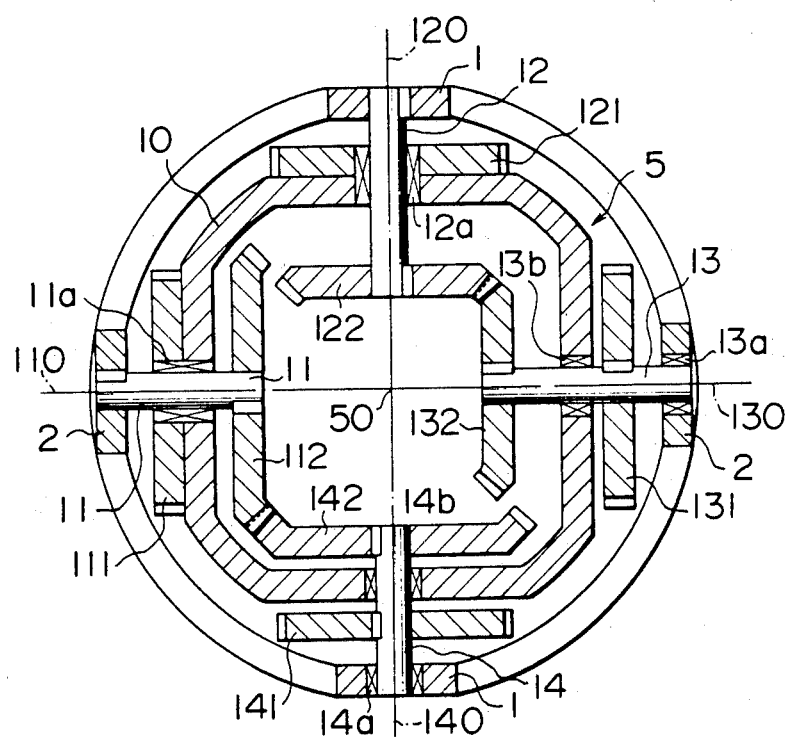
FIG. 3 is a transverse sectional view of the joint of the embodiment shown in FIG. 1, showing its details.
Figure 4:
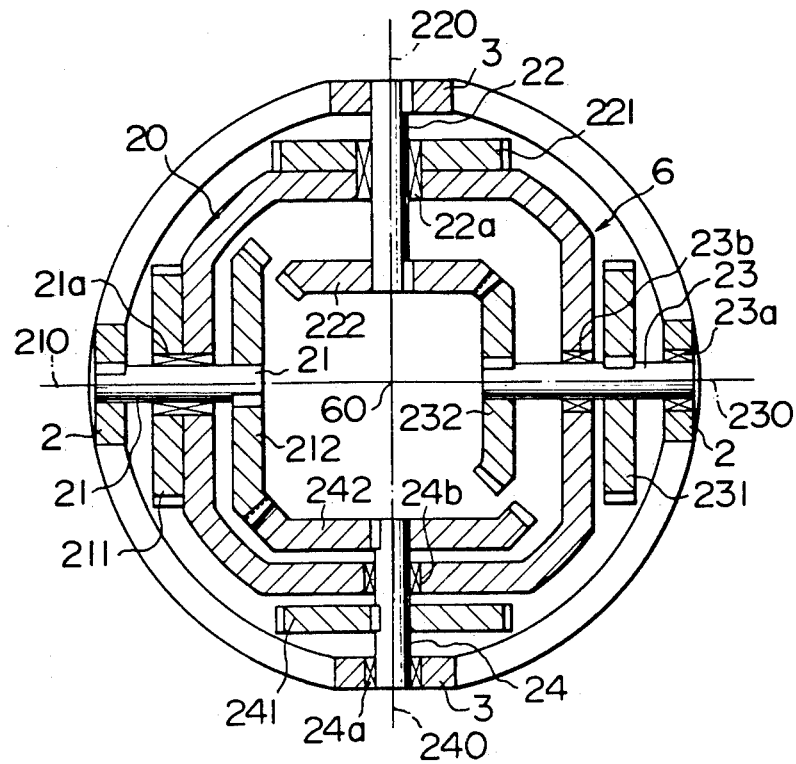
FIG. 4 is a transverse sectional view of the joint located adjacent the joint shown in FIG. 3, showing its details.
Figure 5:
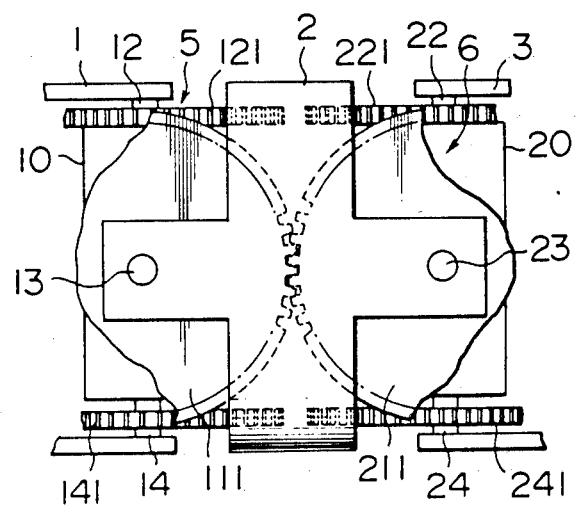
FIG. 5 is a side view of the finger bone of the embodiment shown in FIG. 1.

As shown most clearly in FIG. 4, the joint 6 connecting the finger bones 2, 3 is identical with the joint 5 shown in FIG. 3 and gimbals 20 are connected to the finger bones 2, 3 through shafts 21, 22, 23 and 24, with the shafts 21, 23 being connected to the finger bone 2, the shafts 22, 24 being connected to the finger bone 3. The shafts 21, 22, 23 and 24 correspond to the shafts 11, 12, 13 and 14 shown in FIG. 3, respectively. Spur gears 211, 221, 231 and 241 and bevel bears 212, 222, 232 and 242 correspond to spur gears 111, 121, 131 and 141 and bevel gears 112, 122, 132 and 142 shown in FIG. 3, respectively, in arrangement. As shown in FIG. 5, the spur gear 111 of the joint 5 is in meshing engagement with the spur gear 211 of the joint 6. Although not shown in FIG. 5, the spur gears 131, 231 are also in meshing engagement with each other on a side opposite the side on which the spur gears 111 and 211 are in meshing engagement.

As shown in FIGS. 2-5, by the action of the gimbals 10 of the joint 5, the finger bones 1, 2 can be angularly displaced in any direction as desired. More specifically, they are constructed such that they are capable of producing angular displacement components excepting those about the main axes 100, 200. As is geometrically clear, such angular displacement can be decomposed into angular displacement components about the main axes 110, 120. Thus, the angular displacement about the main axes 110, 120 can be transmitted to the joint 6 between the finger bones 2, 3. Transmission of the angular displacement about the main axis 110 will be described separately from transmission of the angular displacement about the main axis 120. For convenience's sake, the relative displacement of the finger bone 2 will be considered based on the coordinates system affixed to the finger bone 1.

Figure 2:
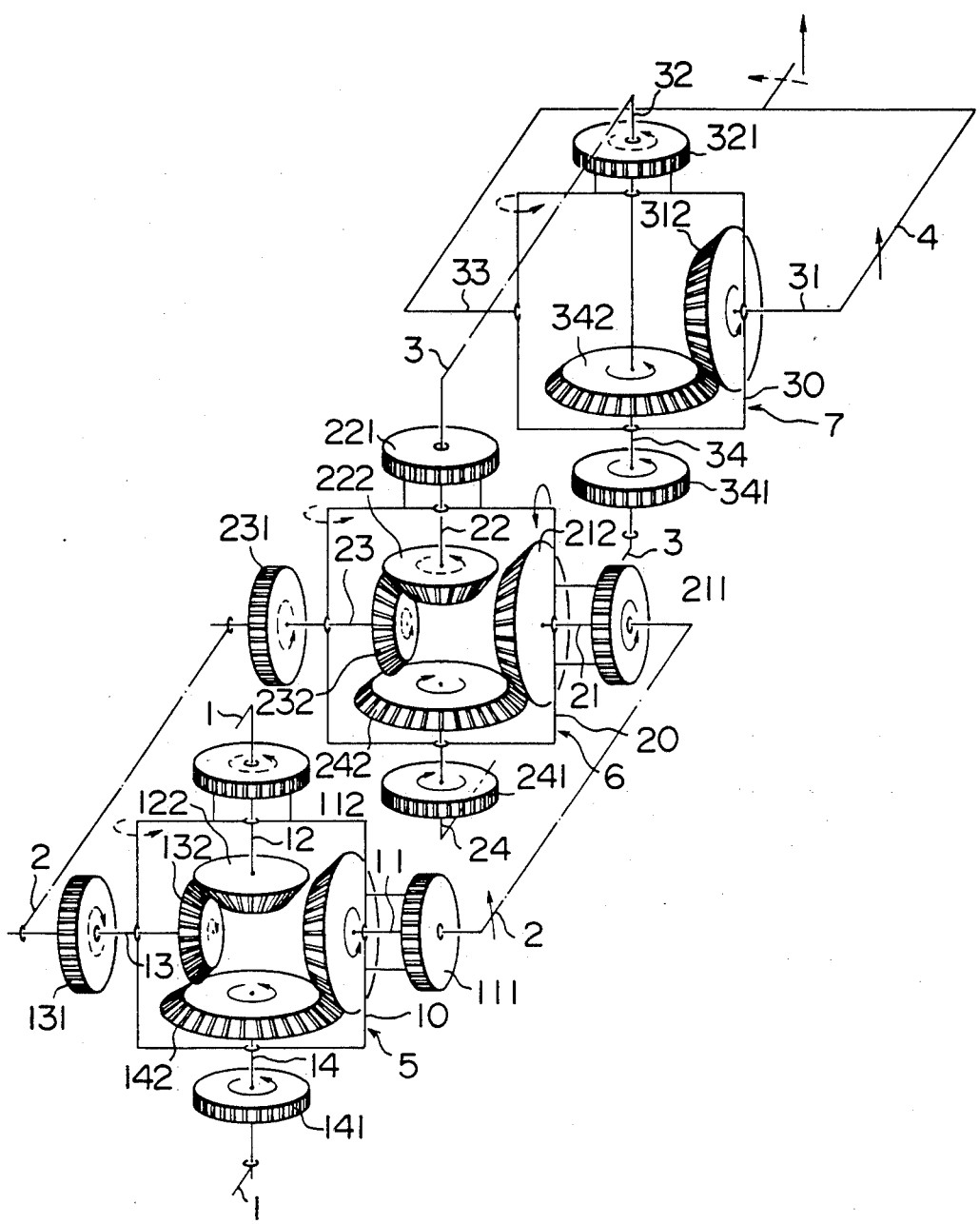
FIG. 2 is a perspective view of the construction of the wrist mechanism shown in FIG. 1, with gimbals being used as joints.
Figure 6:
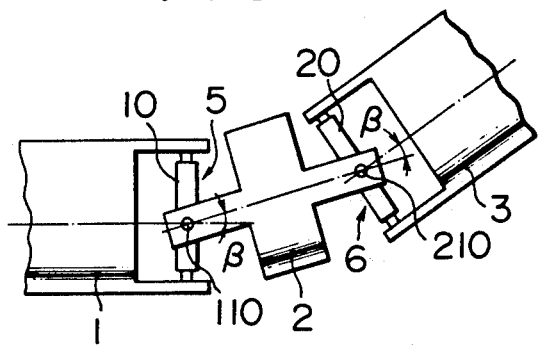
FIG. 6 is a view in explanation of the bending displacement operation of the embodiment shown in FIG. 1.

Movements about the main axis 110 shown in FIG. 3 will first be explained as being applied to FIG. 6. When a rotation indicated by an arrow in FIG. 2 is imparted to the spur gear 141, the finger bone 2 moves upwardly by the meshing engagement of the bevel gears 142, 112, so that the finger bone 2 is rotated through an angle $\beta$ about the main axis 110 with respect to the finger bone 1 as shown in FIG. 6. This causes the main axis 210 of the joint 6 to move arcuately about the main axis 110, as shown in FIG. 6. At this time, the gimbals 10 are not displaced with respect to the finger bone 1. Thus, the spur gear 111 affixed to the gimbals 10 shown in FIGS. 2 and 3 is not displaced with respect to the finger bone 1. On the other hand, since the spur gear 211 of the joint 6 shown in FIG. 4 has its center on the main axis 210, the spur gear 211 rotates while meshing with the spur gear 111 and further the center of the spur gear 211 rotates around the spur gear 111. Namely, the spur gear 211 is displaced through an angle $\beta$ with respect to the finger bone 2. This spur gear 211 is affixed to the gimbals 20 as shown in FIGS. 2 and 4 and is connected to the finger bone 3 through the shafts 22 and 24 connected to the gimbals 20, thus the finger 3 is displaced through an angle β with respect to the finger bone 2. As a result, when the finger bones 1, 2 rotate about the main axis 110 with respect to each other, the finger bones 2, 3 rotate about the main axis 210 parallel to the main axis 110 with respect to each other through the same angle as between the finger bones 1, 2. Accordingly, the transmission of the angular displacement is accomplished.

Figure 7:
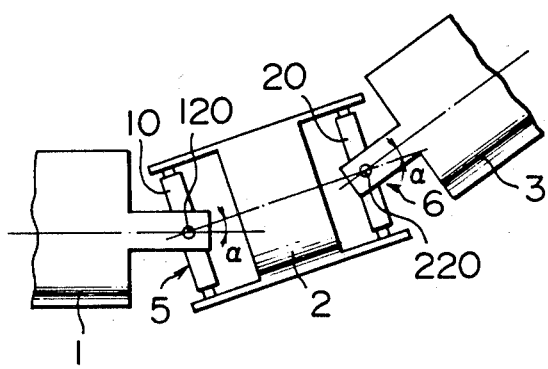
FIG. 7 is a view in explanation of the swinging displacement operation of the embodiment shown in FIG. 1.

Movements about the main axis 120 shown in FIG. 3 is more clearly evident from a review of FIG. 7. More particularly, if a rotation in the direction of a broken line arrow is imparted to the spur gear 121 in FIG. 2 at this time, then the finger bone 2 rotates through an angle α about the main axis 120, so that the gimbals 10 also rotate through an angle α about the main axis 120 with respect to the finger bone 1. At this time, the bevel gears 122 and 132 are in meshing engagement with each other and the bevel gear 122 is affixed to the finger bone 1, so that the bevel gear 132 rotates while having its position of meshing with the bevel gear 122 moving. That is, the bevel gear 132 rotates through an angle α about the main axis 130. Since the spur gear 131 is affixed to the bevel gear 132 through the shaft 13 at this time, the spur gear 131 rotates through an angle α about the main axis 130. Furthermore, since the spur gear 131 is in meshing engagement with the spur gear 231 as shown in FIG. 5, the spur gear 231 rotates through an angle α about the main axis 230. The spur gear 231 is affixed to the bevel gear 232 through the shaft 23 as shown in FIG. 4, so that the bevel gear 232 rotates through an angle α. Since the bevel gear 222 is meshed with the bevel gear 232, the bevel gear 222 rotates through an angle α about the main axis 220. With the bevel gear 222 being affixed to the finger bone 3 through the shaft 22, the finger bone 3 is relatively displaced about the main axis 220 with respect to the finger bone 2. That is, if the finger bones 1, 2 are rotated relative to each other about the main axis 120, then the finger bones 2, 3 are relatively rotated through the same angle about the main axis 220 which is parallel to the main axis 120, thereby enabling transmission of an angle to be achieved.

From the foregoing description, it will be appreciated that the mechanism according to the invention enables transmission of a rotational angular displacement about axes crossing each other at a right angle to each other to be achieved.

The angle α described hereinabove will be referred to as a swinging angular displacement and the angle α described hereinabove will be referred to as a bending angular displacement.

In the foregoing description, the swinging angular displacement and the bending angular displacement have been described as being transmitted singly. When the two different angular displacement components are provided at the same time, they are prevented from interfering with each other according to the invention, as presently to be described in detail.

Figure 8:
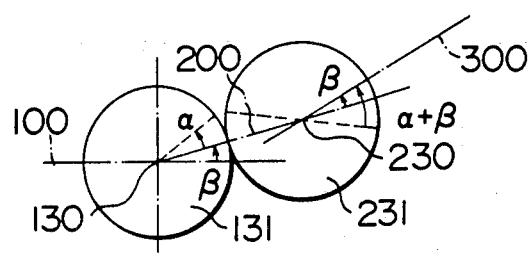
FIG. 8 is a view in explanation of the composite swinging/bending operation.

Assume that the finger bone 2 is provided with a swinging angular displacement component of an angle α and a bending angular displacement component of an angle β relative to the finger bone 1. In view of the mechanism according to the invention, it will be apparent that the bending angular displacement or the rotation angular displacement about the main axis 110 can be transmitted without being influenced by the swinging angular displacement. Meanwhile, with respect to the swinging angular displacement or the rotational angular displacement about the main axis 120, the bevel gear 132 shown in FIG. 3 revolves about the bevel gear 122 through an angle α and rotates through an angle α about the main axis 130 as viewed from the coordinates system affixed to the finger bone 1 as a rotation about its own axis 130 stemming from the meshing engagement. At this time, the finger bone 2 is angularly displaced about the main axis 130 by an angle β with respect to the finger bone 1. Thus, the spur gear 131 rotates through an angle α and the spur gear 231 is displaced through an angle β while meshing with the spur gear 131 in such a manner that the center line 230 thereof is located on an arc centered at the main axis 130. The aforesaid operation is shown in FIG. 8. Since the spur gears 131, 231 are meshing with each other as shown in FIG. 5, the spur gear 231 rotates relative to the finger bone 2 through an angle α+β about the main axis 230. The bevel gear 232 also rotates through the angle α+β. At this time, the finger bones 2, 3 have been angularly displaced through the angle β about the main axis 230 as described hereinabove, and the bevel gear 222 has revolved through the angle β about the bevel gear 232 and has rotated through the angle β about its own axis stemming from the meshing engagement. Thus, the bevel gear 222 is displaced about the main axis 220 relative to the finger bone 2 through an angle α obtained by subtracting the above mentioned rotational angle β about the main axis 220 from the rotational angle α+β of the bevel gear 232 about the main axis 230. Stated differently, the finger bone 3 produces a rotational angular displacement of an angle α in a swinging direction relative to the finger bone 2. From the foregoing description, it will be appreciated that even if the swinging and bending angular displacement components are produced between the finger bones 1, 2 at the same time, they can be transmitted as an angular displacement between the finger bones 2, 3 without any mutual interference.

The foregoing description refers to transmission of an angular displacement of the joint 5 posterior to the finger bone 2 serving as an intermediate link to the joint 6 anterior to the finger bone 2. Transmission of an angular displacement to the joint 7 between the finger bones 3 and 4 will be described.

Figure 9:
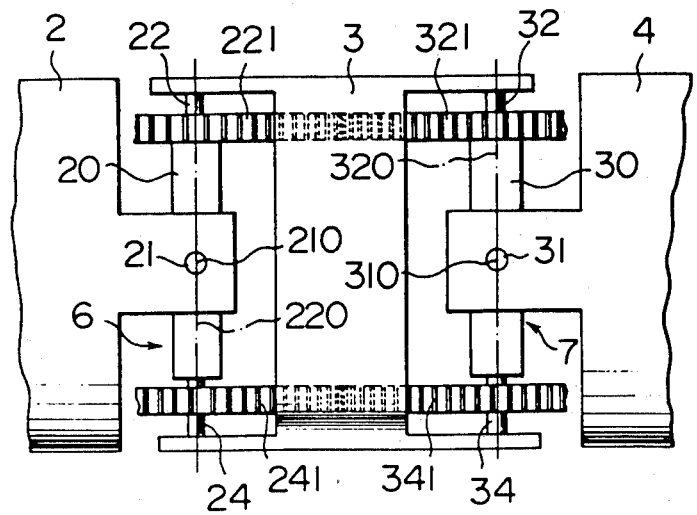
FIG. 9 is a fragmentary sectional view of the finger bone located adjacent the joint shown in FIG. 5.
Figure 10:
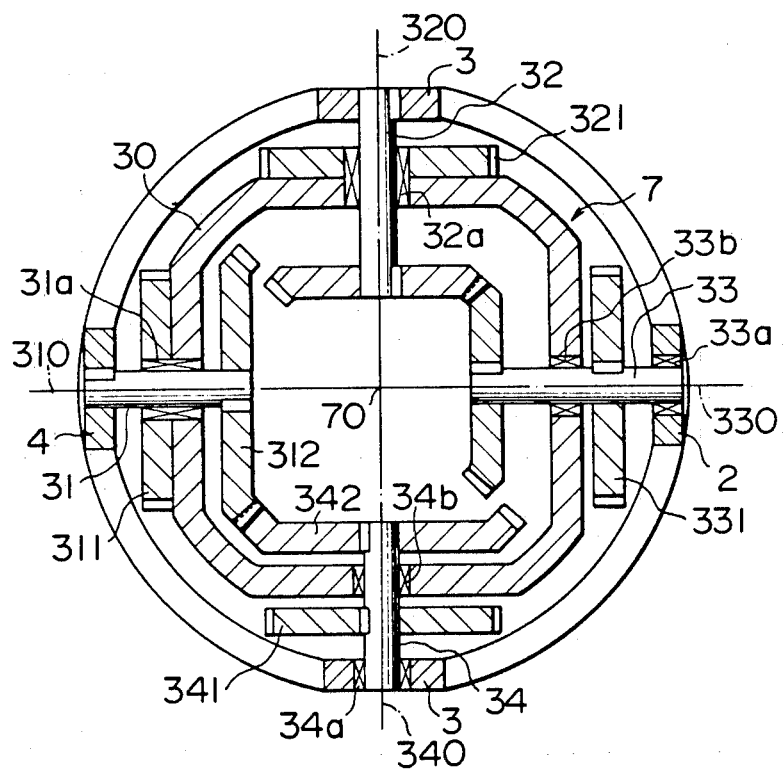
FIG. 10 is a transverse sectional view of the joint located adjacent the joint shown in FIG. 4, showing its details.

The joint 7 is substantially the same construction as the joint 5 shown in FIG. 3, so that the detailed description thereof will be omitted. The joint 7 is constructed as shown in FIG. 10. In FIG. 9, the numerals 310, 320 respectively correspond to the main axes 110, 120 respectively shown in FIG. 3, and the numerals 31, 32 and 33 correspond to the shafts 11, 12 and 13 shown in FIG. 3, while the numerals 30, 311 and 331 correspond to the gimbals 10 and the spur gears 111 and 131 shown in FIGS. 2 and 3, respectively.

In the mechanism of the aforesaid construction, a swinging angular displacement and a bending angular displacement can be transmitted between the finger bones 3 and 4, in a manner described more fully hereinbelow.

It has already been described that a swinging angular displacement can be transmitted from the joint 5 to the joint 6. At this time, the gimbals 20 of the joint 6 are relatively stationary with respect to the finger bone 2 and the finger bone 3 rotates through an angle α about the main axis 220 shown in FIG. 9. Thus, a main axis 320 on the finger bone 3 moves on an arc centered at the main axis 220 while a spur gear 321 rotates on its own axis while revolving around the spur gear 221. Thus, the gimbals 30 affixed to the spur gear 321 rotate to cause the finger bone 4 to be displaced through an angle α relative to the finger bone 3.

A bending angular displacement β is transmitted from the joint 5 to the joint 6 as described hereinabove. At this time, a bevel gear 242 is in meshing engagement with a bevel gear 212 in the joint 6 affixed to the finger bone 3. Thus, the bevel gear 242 rotates through an angle β about the main axis 240 as the finger bone 3 rotates through the angle β. This causes a spur gear 241 to rotate through the angle β about the main axis 240, causing spur gear 341 of the joint 7 in meshing engagement with the spur gear 241 to rotate about a main axis 340 through the angle β. Rotation of the spur gear 341 is transmitted to a bevel gear 312 through a bevel gear 342 secured to the spur gear 341, so that the finger bone 4 affixed to the bevel gear 312 rotates through an angle β in a bending direction relative to the finger bone 3.

Stated differently, a swinging angular displacement and a bending angular displacement are transmitted from the joint 6 to the joint 7 by a mechanism substantially similar to the mechanism for transmitting a swinging angular displacement and a bending angular displacement from the joint 5 to the joint 6. Thus, in transmitting angular displacements to the joint 7 from the joint 6, it will be apparent that the swinging angular displacement component and the bending angular displacement component can be transmitted without mutual interference in the same manner as the swinging angular displacement component and the bending angular displacement component are transmitted without mutual interference from the joint 5 to the joint 6 as described hereinabove.

In the embodiment of the invention shown and described hereinabove, the mechanism has four finger bones. However, it will be understood that the invention is not limited to this specific number of finger bones and that by increasing the number of finger bones by connecting similar constructions, it is possible to obtain a mechanism capable of transmitting angular displacements in any direction as desired.

Figure 11:
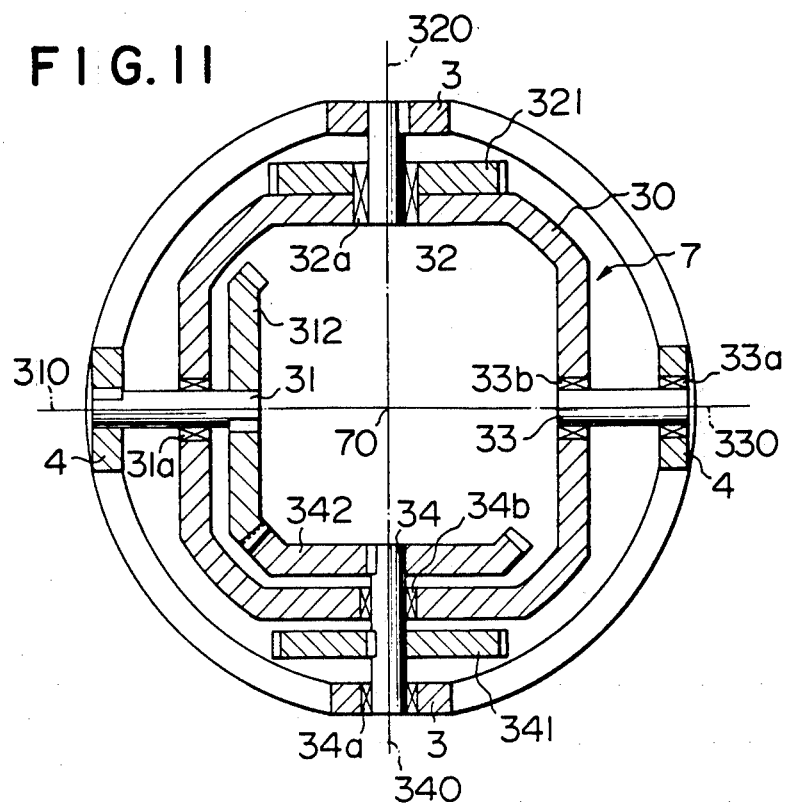
FIG. 11 is a transverse sectional view of a modification of the joint located at a forward and of the embodiment shown in FIG. 1.

The joint connected to the finger bone located at the forward end of the mechanism can have its construction simplified because no joint is connected thereto. One example of the simplified form of joint is shown in FIG. 11 which is a simplified construction of the joint 7 of the embodiment shown in FIGS. 1 and 2. It will be seen that when the construction of FIG. 11 is compared with the construction of the joint 5 shown in FIG. 3, members corresponding to the bevel gears 122 and 132 and the spur gears 111 and 131 are eliminated.

In FIG. 3, the finger bone 1 is the finger bone located at the end. Thus, a construction similar to that shown in FIG. 10 may be used depending on the method of driving of the mechanism.

In the embodiment shown and described hereinabove, the finger bone construction has an open space in the vicinity of the center axis. Thus, when the mechanism is used as a wrist of a robot, it is possible to allow wires and the like to extend therethrough to the tool at the forward end to transmit motive force thereto.

Figure 12:
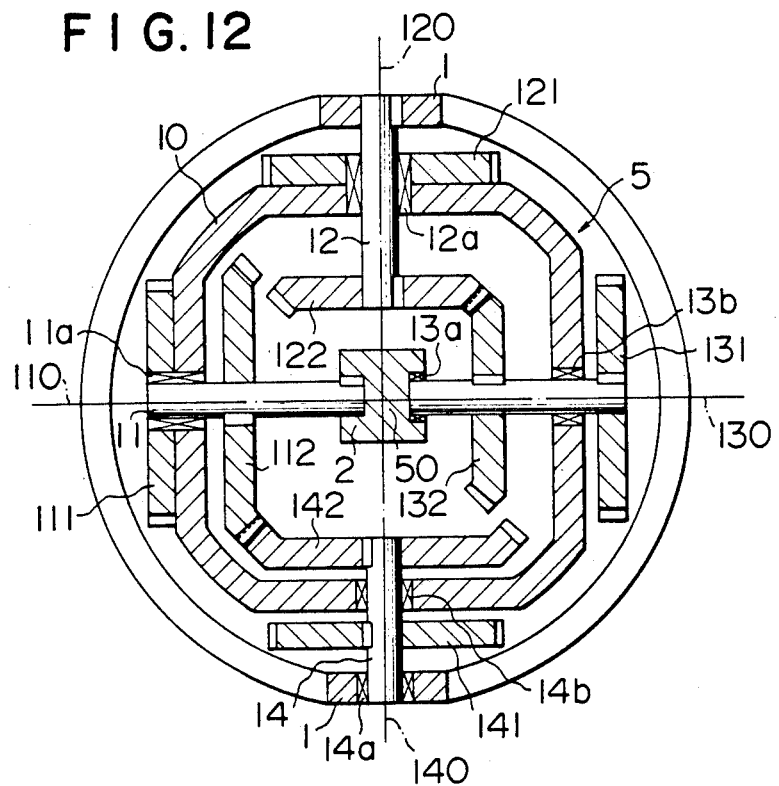
FIG. 12 is a transverse sectional view of another embodiment of the wrist mechanism according to the invention, showing the details corresponding to the details of the joint shown in FIG. 3.

FIG. 12 shows another embodiment of the angular displacement transmitting mechanism in conformity with the invention, showing a construction substantially similar to the joint construction shown in FIG. 3. The embodiment of FIG. 12 is substantially similar in the construction for transmitting angular displacements to the embodiment described hereinabove, except that the finger bones 2, 4 are distinct from the corresponding finger bones in being in the form of a shaft. The embodiment of FIG. 12 offers the advantage that, since mutual interference of the members due to collision caused by angular displacements of the finger bones can be minimized, the movable angle range can be increased.

Figure 13:
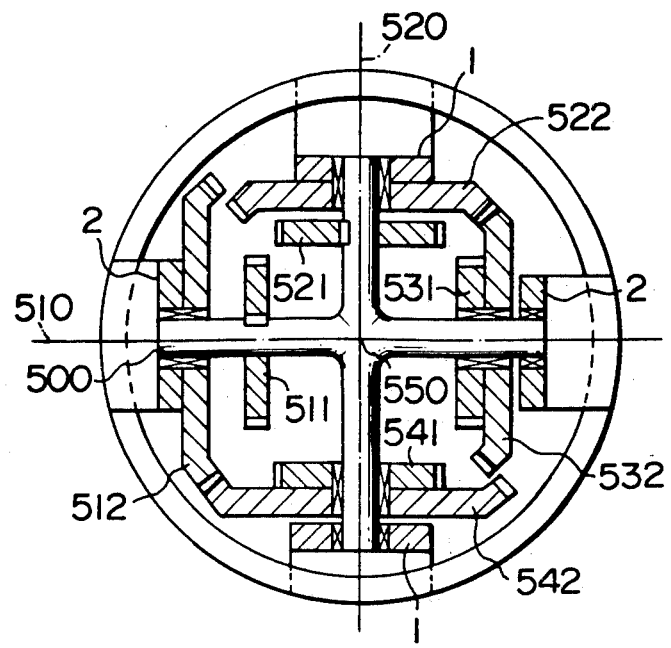
FIG. 13 is a transverse sectional view of another modification of the joint according to the invention, showing the details corresponding to the details of the joint shown in FIGS. 3 and 12.

FIG. 13 shows a modification of the joint construction distinct from the joint constructions of the two embodiments described hereinabove. However, it is to be understood that each of the joints 5, 6 and 7 may be of the same construction as described hereinabove. The joint construction shown in FIG. 13 corresponds to the joint 5 of FIG. 3. The point shown in FIG. 13 has as its basic component a cross shaft 500 constituting a Hooke's joint. The cross shaft 500 includes main axes 510, 520 crossing each other at a right angle. A junction 550 of the main axes 510, 520 defines a center of the joint. The cross shaft 500 has secured thereto spur gears 511, 521, 531 and 541 and bevel gears 512, 522, 532 and 542. The spur gear 511 is affixed to the cross shaft 500 with the main axis 510 as its center and the spur gear 521 is affixed to the cross shaft 500 with the main axis 520 as its center. The spur gears 531, 541 are mounted for rotation about the main axes 510, 520, respectively, as their center axes. The bevel gears 532, 542 are affixed to the spur gears 531, 541 in such a manner that their center axes respectively correspond to one another. The bevel gear 512 is affixed to the finger bone 2 with the main axes 510 as its center axis for rotation thereabout. The bevel gear 522 is affixed to the finger bone 1 with the main axis 520 as its center axis for rotation thereabout. In addition, bevel gears 512, 522 are in meshing engagement with bevel gears 542, 532 respectively.

Figure 14:
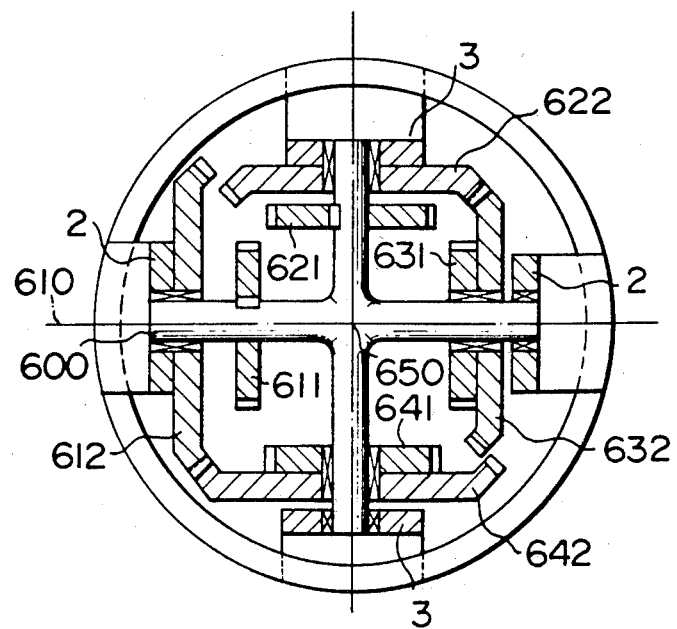
FIG. 14 is a transverse sectional view of the joint located adjacent the joint shown in FIG. 13, showing its details.

As shown in FIG. 14, a cross joint 600 is provided which corresponds to the cross joint 500 shown in FIG. 13. Spur gears 611, 621, 631 and 641 and bevel gears 612, 622, 632 and 642 respectively correspond to the spur gears 511, 521, 531 and 541 and the bevel gears 512, 522, 532 and 542 shown in FIG. 13 respectively. The bevel gear 612 is affixed to the finger bone 3 and the bevel gear 622 is affixed to the finger bone 2.

Figure 15:
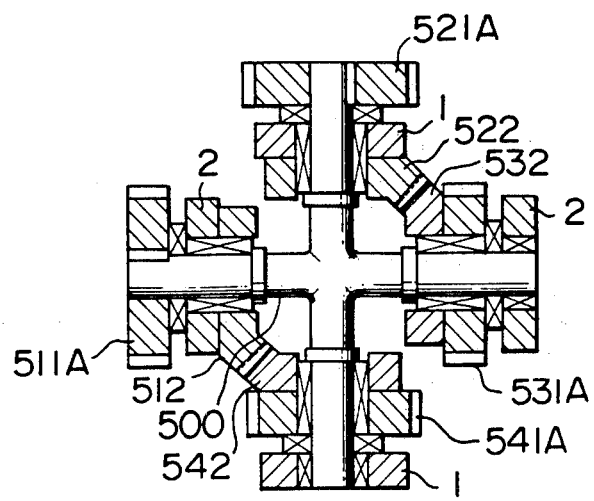
FIG. 15 is a transverse sectional view of still another embodiment of the invention, showing the detail of the joint part.

The embodiment shown in FIG. 15 is distinct from the embodiment shown in FIG. 13 in that spur gears 511A, 521A, 531A and 541A are arranged outside the bevel gears 512, 522, 532 and 542, with the bevel gears 512, 522, 532 and 542 being constructed as partial bevel gears. This arrangement enables the diameter of the finger bones to be reduced and a compact light weight joint and a wrist mechanism as whole can be realized.

Figure 16:
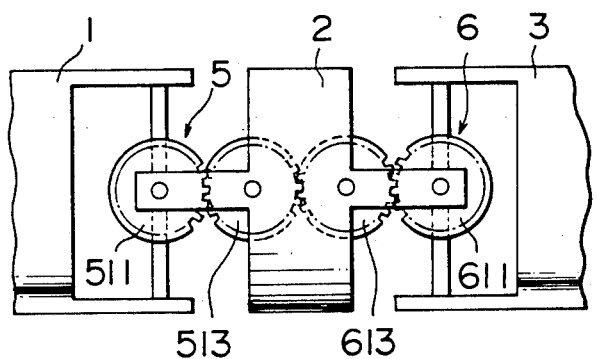
FIG. 16 is a fragmentary side view of a modification of the finger bone associated with the joint shown in FIG. 13.

As shown in FIG. 16, the finger bone 2 is composed of a train of spur gears. The spur gear 511 is connected to a spur gear 611 through spur gears 513, 613, and the spur gear 531 is connected to a spur gear 631 through spur gears 533, 633, in a manner not shown. the spur gears 513, 613, 533 and 633 are used as intermediate gears.

The principle of transmitting angular displacements between the finger bones in this the embodiment of FIG. 16 is similar to that described by referring to the previous embodiments, so that detailed description will be omitted. It will be apparent that rotational angular displacement components around the main axes 510, 520 shown in FIG. 13 can be transmitted, that the swinging angular displacement and the bending angular displacement do not interfere with each other; that the angular displacements can be transmitted to the joint located further ahead and the number of finger bones can be increased and that the construction can be simplified as shown in FIG. 11.

In the modification shown in FIG. 16, the joints can have their sizes reduced, and it is possible to increase the length of the finger bones. Also, fabrication of the mechanism can be facilitated.

In all the embodiments described hereinabove, bevel and spur gears have been described as being used as angular displacement transmitting means. The bevel gears are intended to transmit a direction change of the rotary shaft, while the spur gears are intended to transmit a rotation to the next following joint. It is to be understood that the mechanism according to the invention is not limited to the use of the spur and bevel gears as angular displacement transmitting means and that other machine elements having similar functions may be used to constitute the angular displacement transmitting mechanism according to the invention. In actual practice, the spur gears trains may be replaced by a parallel linkage or chain. Also the alternation of the direction of an angle may be effected by utilizing a space linkage system or a worm and a worm gear. Also a universal joint or the like may be used.

In the mechanism shown in FIG. 1, the finger bone 1 may be fixed and a rotary shaft may be provided to the finger bone 1 as means for transmitting motive force for causing the finger bone 2 to move in bending or swinging movement relative to the finger bone 1, so that rotation of the rotary shaft will be transmitted to the spur gears 121, 141 shown in FIGS. 2 and 3 through spur and bevel gears. Alternatively, an actuator such as, for example hydraulic cylinders, may be mounted between the finger bones 1, 2 to cause the finger bone 2 to tilt relative to the finger bone 1.

From the foregoing description, it will be appreciated that the angular displacement transmitting mechanism according to the invention enables a relative angular displacement of the finger bones or members to be transmitted in the form of angular displacement components about two axes. This enables transmission of angular displacements to be achieved three-dimensionally. This also enables the mechanism to be constituted by parts available in the market, so that the mechanism is low in cost, small in size, easy to fabricate, high in reliability and simple in construction in achieving the end of transmitting angular displacements.

The mechanism with these features is convenient for the purpose of flexible wrist mechanism of industrial robots.

I claim:

1. A wrist mechanism comprising a plurality of rigid links, and a plurality of joint means for connecting adjacent rigid links together, each of said joint means includes a first axis and a second axis intersecting each other at right angles, the first axis of the respective joint means are parallel to each other and the second axis of the respective joint means are parallel to each other when longitudinal axes of the respective links are in alignment with each other, said links include alternately arranged first and second links, each of said first links is connected with and adjacent joint means so as to be rotatable around the first axis, each of said second links is connected with adjacent joint means so as to be rotatable around the second axis, said wrist mechanism further comprises first angular displacement transmitting means for transmitting an angular displacement around the first axis between adjacent links, and second angular displacement transmitting means for transmitting angular displacement around the second axis between adjacent links to the next adjacent links, said first annular displacement transmitting means includes first rotation transmitting means secured to each of the joint means and having an axis on the first axis, first rotation transmitting means engaging with each other between adjacent joint means holding the first link therebetween, second rotation transmitting means secured to each end of each of said first link and having an axis on the first axis, and third rotation transmitting means connected to the joint rotatably around the second axis, the second and third rotation transmitting means engaging with each other in each of the joint means, and fourth rotation transmitting means secured to the third rotation transmitting means and having an axis on the second axis, the fourth rotation transmitting means engaging with each other between adjacent links holding the second link therebetween, said second angular displacement transmitting means including fifth rotation transmitting means secured to each of the joint means and having an axis on the second axis, the fifth rotation transmitting means engaging with each other between adjacent joint means holding the second link therebetween, sixth rotation transmitting means secured to each end of each of the second links and having an axis on the second axis, and seventh rotation transmitting means connected to the joint rotatably around the first axis, the sixth and seventh rotation transmitting means engaging with each other in each of the joint means, and eighth rotation transmitting means secured to the seventh rotation transmitting means and having an axis on the first axis, the eighth rotation transmitting means engaging with each other between adjacent links holding the first link therebetween.

2. A wrist mechanism as claimed in claim 1, wherein, in the joint means connected to the link located at a forward end of the wrist mechanism, one of the first, sixth, seventh, and eighth rotation transmitting means and the second, third, fourth and fifth rotation transmitting means are omitted.

3. A wrist mechanism as claimed in claim 1, wherein said first rotation transmitting means are a pair of spur gears, said second and third rotation transmitting means are a pair of bevel gears, said fourth rotation transmitting means are a pair of spur gears, said fifth rotation transmitting means are a pair of spur gears, said sixth and seventh rotation transmitting means are a pair of bevel gears, and said eighth rotation transmitting means are a pair of spur gears.

4. A wrist mechanism as claimed in claim 3, wherein each of said joint means includes a hollow substantially rectangular member.

5. A wrist mechanism as claimed in claim 4, wherein each of said links are of a hollow cylindrical shape.

6. A wrist mechanism as claimed in claim 4, wherein each of said first links are a solid shaft and each of said second links are of a hollow cylindrical shape.

7. A wrist mechanism as claimed in claim 3, wherein each of said joints includes cross shafts.

8. A wrist mechanism as claimed in claim 7, wherein all of said bevel gears are partial bevel gears.

9. A wrist mechanism as claimed in claim 3, wherein each of said pairs of spur gears engage with each other through even numbered gears.

* * * * *